June 24, 1924.

S. W. NICHOLSON

HANDLE MOUNTING

Filed July 2, 1921

1,498,884

Inventor
Stanley W. Nicholson

By Whittemore Hulbert Whittemore
& Belknap    Attorneys

Patented June 24, 1924.

1,498,884

UNITED STATES PATENT OFFICE.

STANLEY W. NICHOLSON, OF TOLEDO, OHIO, ASSIGNOR TO THE DURA COMPANY, OF TOLEDO, OHIO, A CORPORATION OF DELAWARE.

HANDLE MOUNTING.

Application filed July 2, 1921. Serial No. 482,089.

*To all whom it may concern:*

Be it known that I, STANLEY W. NICHOLSON, a citizen of the United States of America, residing at Toledo, in the county of Lucas and State of Ohio, have invented certain new and useful Improvements in Handle Mountings, of which the following is a specification, reference being had therein to the accompanying drawings.

This invention relates to handle mountings and more particularly to mountings for rotative handles designed for the control of vehicle windows.

The invention consists in the structural features and arrangement of parts hereinafter fully described and illustrated in the accompanying drawing, wherein.

Figure 3:
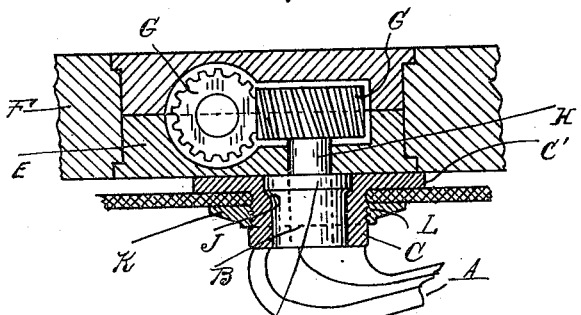
Fig. 3 is a section taken upon line 3—3 of Fig. 2.
Figure 1:
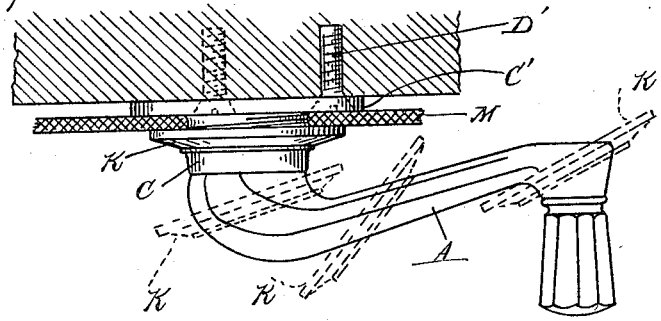
Fig. 1 is a view in side elevation of the improved handle mounting.
Figure 2:
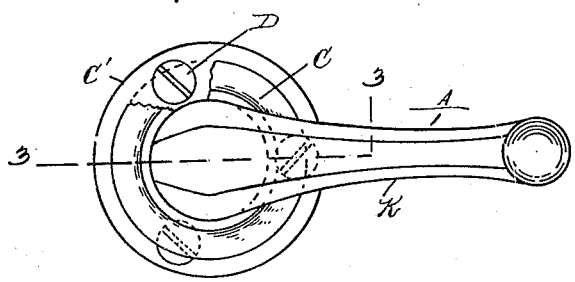
Fig. 2 is a front view of the same.

In these views, the reference character A designates a handle member having at one end the reduced journal portion B engaging a bearing C having an integral attaching flange C'. Screws D engaging said flange mount the bearing C upon a gear box E, set into the lock-board F of an automobile door. A pair of intermeshed gears G are mounted in said gear box, one of said gears being coupled by a member H to the handle to establish a drive from the latter to the former. The end I of the journal member B, adjacent said gear box, is enlarged to engage an interior annular shoulder J in the bearing C to retain said journal member in the bearing. The assembly of the parts B and C is established preferably by die casting, the latter in engagement with the former. K is an annular face plate which is adapted to be slipped upon the handle as indicated in dash lines in Fig. 1 and is interiorly screw-threaded to engage a threaded portion L of the bearing C. Said finishing plate functions primarily to hold the fabric M, commonly known as the interior trimming of the vehicle, firmly against the flange C, covering the heads of the screws D, and securing a neat and pleasing appearance.

What I claim as my invention is:

1. In a handle mounting for interior use in a vehicle, the combination with a handle having a journal portion, of a bearing for said portion, an attaching flange upon said bearing, securing means for the bearing engaging said flange and a finishing piece engageable with said bearing to clamp the interior trimming of the vehicle against said flange.

2. In a handle mounting for interior use in a vehicle, the combination with a handle having a journal portion, of a bearing for said portion, an attaching flange upon said bearing, and an annular finishing piece, proportioned to be slipped over the handle and engageable with said bearing to clamp the interior trimming of the vehicle against said flange.

3. In a handle mounting for interior use in a vehicle, the combination with a handle having a journal portion, of a bearing for said portion, and an interiorly threaded annular finishing piece, proportioned to be slipped over the handle and engageable with a threaded portion of said bearing.

4. In a handle mounting for interior use in a vehicle, the combination with a handle, of a journal element for said handle passing through the trimming of the vehicle, and an annular finishing piece, proportioned to be slipped over the handle and to embrace said journal portion concealing the edge of the trimming adjoining said journal element.

5. In a handle mounting for interior use in a vehicle, the combination with a handle journaled at one end and free at the other, of an annular finishing piece proportioned to be passed over the free end and along the shank of the handle to a final position coaxial with the journaled end of the handle.

In testimony whereof I affix my signature.

STANLEY W. NICHOLSON.